(No Model.)
S. H. STEVENS.
GRAIN AND SEED SAMPLER.
No. 262,847. Patented Aug. 15, 1882.
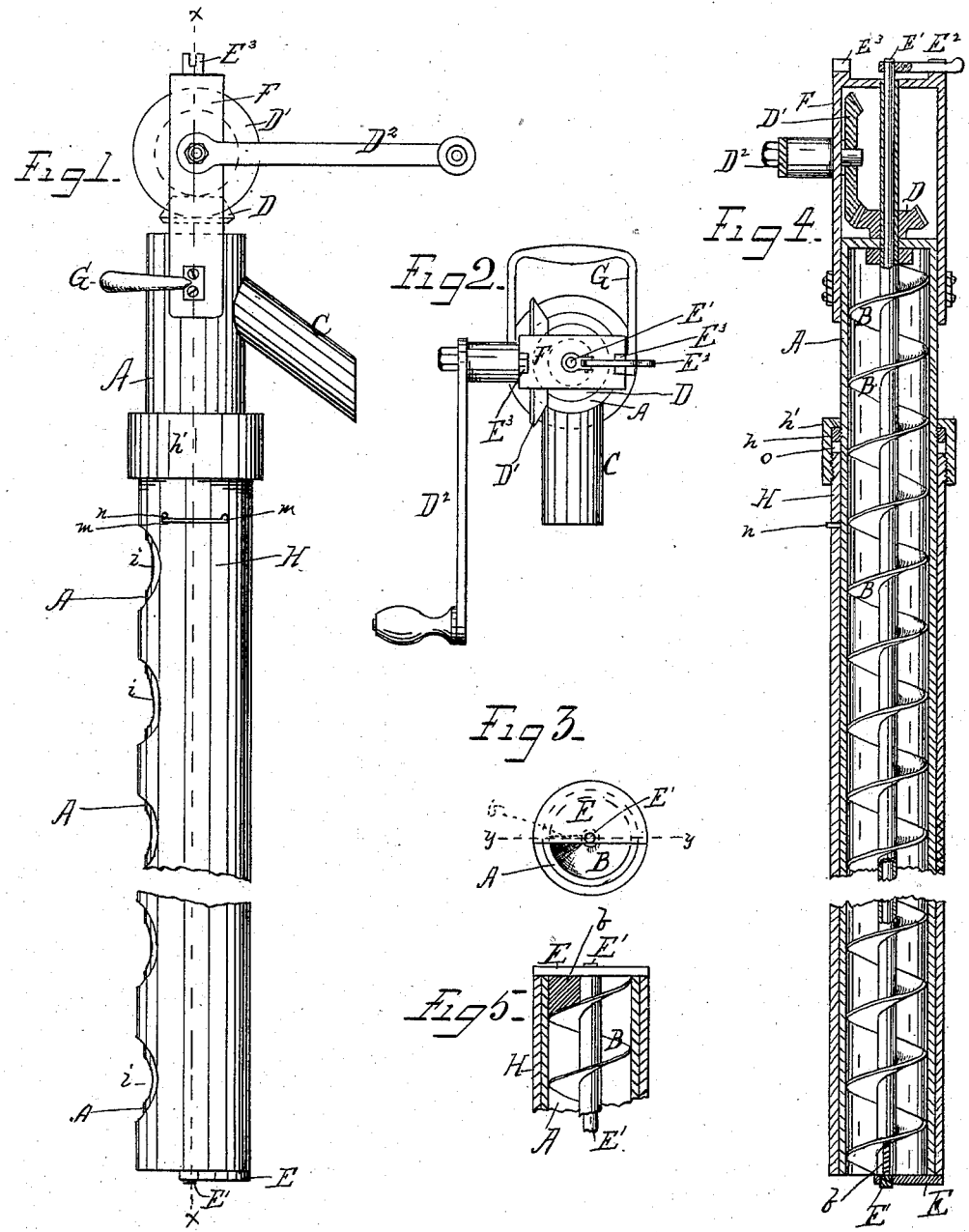
Witnesses
J. Everett Brown
A. W. Munday
Inventor
Sylvanus H. Stevens,
by Munday Evarts & Adcock
his attys.

UNITED STATES PATENT OFFICE.

SYLVANUS H. STEVENS, OF CHICAGO, ILLINOIS.

GRAIN AND SEED SAMPLER.

SPECIFICATION forming part of Letters Patent No. 262,847, dated August 15, 1882.

Application filed April 6, 1882. (No model.)

*To all whom it may concern:*

Be it known that I, SYLVANUS H. STEVENS, of Chicago, in the county of Cook and State of Illinois, have invented a new and useful Improvement in Grain and Seed Samplers, of which the following is a specification.

This invention relates to testers for use in inspecting flax and other seed and grain in cars, bins, and vessels.

The invention consists of a tube provided with a discharge-spout and adapted to be sunk through the body of grain or seed, and of sufficient length to permit its being sunk to the bottom thereof, and provided with a spiral screw-conveyer and means for rotating the same from the top, whereby the grain is drawn into the tube as the latter descends and more or less of every strata taken up by the screw.

The invention also consists in such a tube, conveyer, and driving mechanism, provided with a valve at the bottom of the tube for closing the same against the falling out of the grain in the screw when the apparatus is lifted out. There are other features of novelty in the device which will be pointed out as the description proceeds.

The accompanying drawings show, at Figure 1, a side elevation of my improved sampler; at Fig. 2, a plan view of the same; at Fig. 3, a bottom view, and at Fig. 4 a sectional elevation on the line $x\ x$ of Fig. 1. Fig. 5 is a partial vertical section of the bottom of the sampler upon the line $y\ y$ of Fig. 3.

In the drawings, A represents a tube of the proper diameter and length, fitted with an internal screw-conveyer, B. The latter extends from the bottom to a point above the discharge-spout C. The shaft of the conveyer passes through the closed top of the tube, and is there provided with a beveled pinion, D, which meshes with a vertical beveled pinion, D', which is rotated by the crank D². At the bottom of the tube is a semicircular valve, E, the function whereof is to hold the grain in the tube after it has been filled, and it is attached to a rod, E', which passes through the screw-conveyer shaft from top to bottom. At the top this rod is provided with a jointed lever, E², by which it is rotated, and which drops into the catches E³ at either side, whereby to lock the valve in the desired position, either open or closed. A yoke, F, extends upward from the top of the tube, and forms a support for the crank-shaft and the catches. A handle, G, is affixed upon the side of the tube opposite the spout, whereby the device is steadied when being lowered into the grain and carried from place to place.

In operating the device, the inspector places it upon the body of grain to be sampled, and immediately commences the rotation of the screw, and continues such rotation until the sampler touches the bottom of the grain-receptacle. By so doing the sampler clears its own way downward, drawing within itself the portions displaced. The tube, it will be noticed, extends so as to be flush with the bottom of the conveyer. This prevents the making of any hole in the body of grain as the device descends, and secures the drawing into the sampler of all the grain which lies in its path. In this manner I am able to determine the character of the grain at any particular point in the vertical line taken by the sampler.

I sometimes make windows or openings $i$ in the tube at appropriate distances apart, through which the grain may be inspected while it lies in the conveyer, and where that is done an outer tube, H, provided with like openings, is applied to the apparatus in such manner that it may be rotated thereon for the purpose of exposing or closing said windows. For the purpose of holding said outer tube, a collar, $h$, is secured to the outside of the main tube. Over that a flanged collar, $h'$, is fitted, the latter being secured to the outer tube. A horizontal slot, $m$, in the outer tube, having enlarged ends, serves, in connection with the pin $n$, projecting from the main tube to lock the outer tube from turning. A space, $o$, between the top of the outer tube and the collar $h'$ is left to permit a slight longitudinal movement of the outer tube, necessary in unlocking it from the pin $n$. A vertical partition, $b$, is secured to the screw at the bottom in a line with the bottom edge of the screw and at the opposite side of the axial line thereof, and serves to block the escape of the grain at that part of the tube not covered by the valve E. This partition is shown in dotted lines in Fig. 3.

I claim—

1. The grain-sampler consisting of a tube adapted to be inserted vertically through the body of seeds or grain, and having suitable inlet and outlet openings, a screw-conveyer rotating in said tube, and devices for operating said conveyer, located at the top of the apparatus, substantially as specified.

2. The grain-sampler consisting of a tube adapted to be inserted vertically through the body of the grain, and having suitable inlet and outlet openings, a screw-conveyer rotating in said tube, devices for operating said conveyer, and a valve at the bottom of the tube, substantially as and for the purpose specified.

3. The combination, with the sampler consisting of the tube having a suitable inlet and outlet for the grain and window-openings for viewing the same, the screw-conveyer, and the devices for rotating the conveyer, of the movable outer tube having openings registering with the window-openings in the main tube, substantially as and for the purpose set forth.

SYLVANUS H. STEVENS.

Witnesses:
H. M. MUNDAY,
EDMUND ADCOCK.